(12) United States Patent
Murata

(10) Patent No.: US 8,379,121 B2
(45) Date of Patent: Feb. 19, 2013

(54) IMAGE-CAPTURING DEVICE AND IMAGING APPARATUS

(75) Inventor: Hironobu Murata, Yokohama (JP)

(73) Assignee: Nikon Corporation, Tokyo (JP)

( * ) Notice: Subject to any disclaimer, the term of this patent is extended or adjusted under 35 U.S.C. 154(b) by 124 days.

(21) Appl. No.: 13/083,093

(22) Filed: Apr. 8, 2011

(65) Prior Publication Data

US 2011/0273599 A1 Nov. 10, 2011

(30) Foreign Application Priority Data

Apr. 8, 2010 (JP) ................................. 2010-089671

(51) Int. Cl.
H04N 5/232 (2006.01)
H04N 9/083 (2006.01)
H04N 9/04 (2006.01)
H04N 3/14 (2006.01)
H04N 5/335 (2006.01)
G03B 27/10 (2006.01)

(52) U.S. Cl. .......................... 348/272; 348/345; 348/275

(58) Field of Classification Search .......... 348/345–356, 348/272–276, 315
See application file for complete search history.

(56) References Cited

U.S. PATENT DOCUMENTS

| | | | |
|---|---|---|---|
| 5,815,748 A * | 9/1998 | Hamamura et al. | 396/104 |
| 6,819,360 B1 * | 11/2004 | Ide et al. | 348/340 |
| 7,006,140 B2 * | 2/2006 | Shono | 348/349 |
| 7,057,659 B1 * | 6/2006 | Mihara et al. | 348/345 |
| 7,911,507 B2 * | 3/2011 | Egawa et al. | 348/230.1 |
| 2005/0248667 A1 * | 11/2005 | Schweng et al. | 348/234 |
| 2007/0154200 A1 * | 7/2007 | Utagawa et al. | 396/111 |
| 2008/0056700 A1 * | 3/2008 | Toyama | 396/114 |
| 2008/0267601 A1 * | 10/2008 | Kobayashi | 396/91 |
| 2010/0188532 A1 * | 7/2010 | Kusaka et al. | 348/240.99 |
| 2010/0214452 A1 * | 8/2010 | Kawarada | 348/255 |
| 2011/0085062 A1 * | 4/2011 | Rhodes | 348/279 |

FOREIGN PATENT DOCUMENTS

JP A-2007-233032 9/2007

* cited by examiner

*Primary Examiner* — Nhan T Tran
*Assistant Examiner* — Tuan Le
(74) *Attorney, Agent, or Firm* — Oliff & Berridge, PLC

(57) ABSTRACT

An image-capturing device includes: a first image sensor equipped with first and second image-capturing pixels and first focus detection pixels, each of which receives one of light fluxes formed by splitting subject light having passed through an optical system, the first and the second image-capturing pixels generating first and second color signals respectively and the first focus detection pixels outputting focus detection signals indicating a state of focus detection pertaining to the optical system; and a second image sensor equipped with third image-capturing pixels and second focus detection pixels, each of which receives another light flux, the third image-capturing pixels generating third color signals and the second focus detection pixels outputting focus detection signals, wherein: when n represents a quantity of the first image-capturing pixels, quantities of the second and the third image-capturing pixels, and the first and the second focus detection pixels are n, 2n, 2n and 2n respectively.

15 Claims, 8 Drawing Sheets

IMAGE-CAPTURING DEVICE AND IMAGING APPARATUS

INCORPORATION BY REFERENCE

The disclosure of the following priority application is herein incorporated by reference:
Japanese Patent Application No. 2010-089671 filed Apr. 8, 2010.

BACKGROUND OF THE INVENTION

1. Field of the Invention

The present invention relates to an image-capturing device equipped with an image sensor that includes focus detection pixels, and an imaging apparatus equipped with the image sensor.

2. Description of Related Art

Japanese Laid Open Patent Publication No. 2007-233032 discloses an imaging apparatus that splits a light flux having traveled from an imaging optical system to a half mirror into two light fluxes at the half mirror, guides one of the light fluxes to an imaging and focus detection means, guides the other light flux to a focus detection means, and adjusts the focusing condition of the imaging optical system based upon focus detection results provided by the imaging and focus detection means and focus detection results provided by the focus detection means. The imaging and focus detection means is constituted with an image sensor that includes a plurality of focus detection pixels disposed among numerous image pick-up pixels disposed in a two-dimensional array. Imaging signals at positions of the focus detection pixels are generated through interpolation executed based upon the imaging signals output from surrounding image pick-up pixels.

SUMMARY OF THE INVENTION

The imaging apparatus in the related art described above requires more focus detection pixels to be disposed in place of image pick-up pixels so as to allow focus detection areas to be set in conjunction with the imaging and focus detection means over a wider range within the photographic field. This means that as more image pick-up pixels are replaced with focus detection pixels, the quality of captured images is bound to be compromised.

According to the 1st aspect of the present invention, an image-capturing device comprises: a first image sensor equipped with a plurality of first image-capturing pixels, a plurality of second image-capturing pixels and a plurality of first focus detection pixels, each of which receives one of light fluxes formed by splitting subject light having passed through an optical system, with the first image-capturing pixels generating first color signals, the second image-capturing pixels generating second color signals and the first focus detection pixels outputting focus detection signals indicating a state of focus detection pertaining to the optical system; and a second image sensor equipped with a plurality of third image-capturing pixels and a plurality of second focus detection pixels, each of which receives another light flux formed by splitting the subject light, with the third image-capturing pixels generating third color signals and the second focus detection pixels outputting focus detection signals indicating a state of focus detection pertaining to the optical system, wherein: when n represents a quantity of the first image-capturing pixels, quantities of the second image-capturing pixels, the third image-capturing pixels, the first focus detection pixels and the second focus detection pixels are n, 2n, 2n and 2n respectively.

According to the 2nd aspect of the present invention, it is preferred that in an image-capturing device according to the 1st aspect, positions of the first focus detection pixels relative to the first image-capturing pixels and the second image-capturing pixels at the first image sensor and positions of the second focus detection pixels relative to the third image-capturing pixels at the second image sensor are in correspondence to each other. According to the 3rd aspect of the present invention, it is preferred that in an image-capturing device according to the 1st aspect, the first image-capturing pixels, the second image-capturing pixels and the first focus detection pixels are disposed in a uniform two-dimensional array so that any two adjacent pixels are of different types; and the third image-capturing pixels and the second focus detection pixels are disposed in a uniform two-dimensional array so that any two adjacent pixels are of different types.

According to the 4th aspect of the present invention, in an image-capturing device according to the 1st aspect, the first color may be red, the second color may be blue and the third color may be green.

According to the 5th aspect of the present invention, an image-capturing device according to the 1st aspect may further comprise: a focus detection unit that detects a state of focus detection pertaining to the optical system by using both focus detection signals output by the first focus detection pixels and focus detection signals output by the second focus detection pixels.

According to the 6th aspect of the present invention, it is preferred that in an image-capturing device according to the 1st aspect, the first focus detection pixels include the first image-capturing pixels and the second image-capturing pixels; and the second focus detection pixels include the third image-capturing pixels.

According to the 7th aspect of the present invention, it is preferred that in an image-capturing device according to the 6th aspect, a row with the plurality of first image-capturing pixels disposed therein and a row with the plurality of second image-capturing pixels disposed therein are set so as to occupy alternate positions along a direction in which pixel columns extend at the first image sensor.

According to the 8th aspect of the present invention, it is preferred that in an image-capturing device according to the 6th aspect, a column with the plurality of first image-capturing pixels disposed therein and a column with the plurality of second image-capturing pixels disposed therein are set so as to occupy alternate positions along a direction in which pixel rows extend at the first image sensor.

According to the 9th aspect of the present invention, an imaging apparatus comprises: a light flux splitting member that splits subject light having passed through a photographic optical system into two separate light fluxes; a first image sensor equipped with a plurality of first image-capturing pixels, a plurality of second image-capturing pixels and a plurality of first focus detection pixels, each of which receives one of the two separate light fluxes, with the first image-capturing pixels generating first color signals, the second image-capturing pixels generating second color signals, and the first focus detection pixels outputting focus detection signals indicating a state of focus detection pertaining to the optical system; and a second image sensor equipped with a plurality of third image-capturing pixels and a plurality of second focus detection pixels, each of which receives another light flux formed by splitting the subject light, with the third image-capturing pixels generating third color signals, and the second focus detection pixels outputting focus detection signals indicating a state of focus detection pertaining to the optical system; an image data generation unit that generates image data by using the first color signals generated at the first image-capturing pixels, the second color signals generated at the second image-capturing pixels and the third color signals generated at the third image-capturing pixels; and a focus adjustment unit that adjusts a focusing condition of the photographic optical system based upon the focus detection signals output from the first focus detection pixels and the focus detection signals output from the second focus detection pixels, wherein: when n represents a quantity of the first image-capturing pixels, quantities of the second image-capturing pixels, the third image-capturing pixels, the first focus detection pixels and the second focus detection pixels are n, 2n, 2n and 2n respectively.

According to the 10th aspect of the present invention, it is preferred that in an imaging apparatus according to the 9th aspect, positions of the first focus detection pixels relative to the first image-capturing pixels and the second image-capturing pixels at the first image sensor and positions of the second focus detection pixels relative to the third image-capturing pixels at the second image sensor are in correspondence to each other.

According to the 11th aspect of the present invention, it is preferred that in an imaging apparatus according to the 9th aspect, the first image-capturing pixels, the second image-capturing pixels and the first focus detection pixels are disposed in a uniform two-dimensional array so that any two adjacent pixels are of different types; and the third image-capturing pixels and the second focus detection pixels are disposed in a uniform two-dimensional array so that any two adjacent pixels are of different types.

According to the 12th aspect of the present invention, in an imaging apparatus according to the 9th aspect, the first color may be red, the second color may be blue and the third color may be green.

According to the 13th aspect of the present invention, it is preferred that in an imaging apparatus according to the 9th aspect, the first focus detection pixels include the first image-capturing pixels and the second image-capturing pixels; and the second focus detection pixels include the third image-capturing pixels.

According to the 14th aspect of the present invention, it is preferred that in an imaging apparatus according to the 13th aspect, a row with the plurality of first image-capturing pixels disposed therein and a row with the plurality of second image-capturing pixels disposed therein are set so as to occupy alternate positions along a direction in which pixel columns extend at the first image sensor.

According to the 15th aspect of the present invention, it is preferred that in an imaging apparatus according to the 13th aspect, a column with the plurality of first image-capturing pixels disposed therein and a column with the plurality of second image-capturing pixels disposed therein are set so as to occupy alternate positions along a direction in which pixel rows extend at the first image sensor.

The image-capturing device and the imaging apparatus according to the present invention reliably prevent the quality of captured images from becoming poor even when a plurality of focus detection pixels are disposed among numerous image-capturing pixels.

DESCRIPTION OF PREFERRED EMBODIMENTS

First Embodiment (Structure)

In reference to FIGS. 1 through 5, the image-capturing device and the imaging apparatus (e.g., a digital camera) achieved in the first embodiment of the present invention are described.

Figure 1:
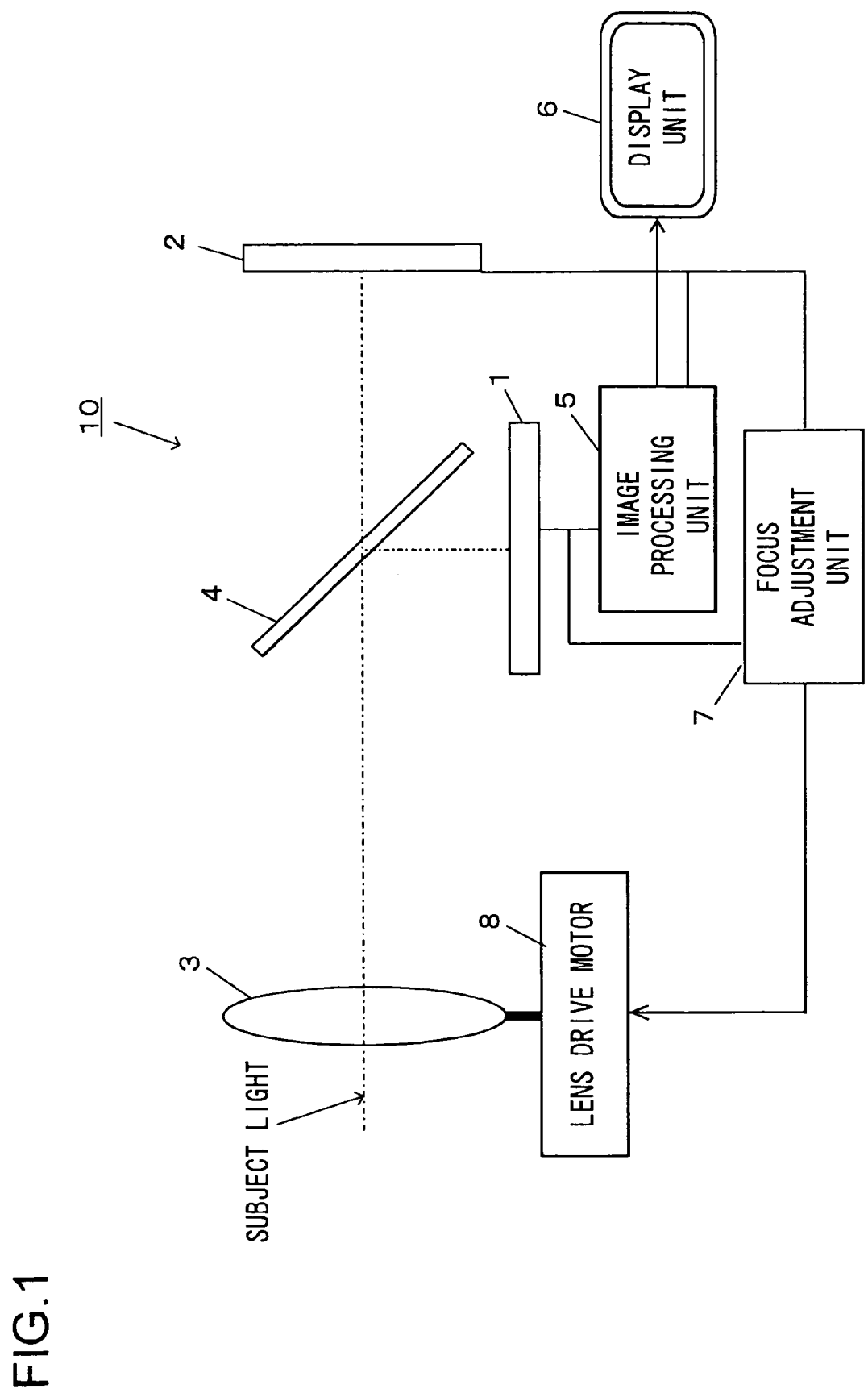
FIG. 1 is a schematic block diagram, showing the structure adopted in the imaging apparatus achieved in an embodiment of the present invention.

As shown in FIG. 1, a digital camera includes a first image sensor 1, a second image sensor 2, a photographic lens 3, a half mirror 4, an image processing unit 5, a display unit 6, a focus adjustment unit 7 and a lens drive motor 8. An image-capturing device 10 is constituted with the first image sensor 1, the second image sensor 2 and the like. The photographic lens 3 includes a focusing lens, a zooming lens, an aperture and the like (none shown) and forms a subject image via the half mirror 4 both onto the imaging plane of the first image sensor 1 and the imaging plane of the second image sensor 2. The illustration in FIG. 1 is simplified by showing the photographic lens 3 as a single lens.

The half mirror 4, constituted with a reflecting film assuming a predetermined thickness, which is formed on the front surface of a transparent substrate, and an antireflection film formed on the rear surface of the transparent substrate, splits incident light into transmitted light and reflected light, demonstrating wavelength distributions equivalent to each other, by allowing some of the incident light to be transmitted through and reflecting the remaining light. The first image sensor 1 and the second image sensor 2, which are primary components of the image-capturing device 10, may each be constituted with a CCD image sensor or a CMOS image sensor. Each image sensor includes both image-capturing pixels and focus detection pixels disposed together in an orderly two-dimensional array pattern. The image-capturing pixels at the first and second image sensors 1 and 2 output imaging signals, whereas the focus detection pixels at the first and second image sensor 1 and 2 output focus detection signals indicating the focusing condition at the photographic lens 3.

The image processing unit 5, which may be configured as, for instance, an ASIC, executes image processing on the imaging signals output from the image-capturing pixels at the first and second image sensors 1 and 2. The image processing executed by the image processing unit includes, for instance, edge enhancement processing, color temperature adjustment (white balance adjustment) processing and format conversion processing executed on imaging signals. In addition, the image processing unit 5 creates image data based upon which a photographic image is brought up on display at the display unit 6. At the display unit 6, an image reproduced based upon image data input thereto from the image processing unit 5 is displayed.

The focus adjustment unit 7 detects image-forming conditions at the imaging planes of the first image sensor 1 and the second image sensor 2, i.e., calculates the extent of defocusing, by executing focus detection arithmetic operations based upon the focus detection signals output from the focus detection pixels at the first and second image sensors 1 and 2. The defocus quantity calculated by the focus adjustment unit 7 is output to the lens drive motor 8. The lens drive motor 8 then executes focus adjustment by driving the focusing lens in the photographic lens 3 along the optical axis based upon the signal output from the focus adjustment unit 7.

While focus detection signals are output from both the first image sensor 1 and the second image sensor 2, the focus adjustment unit 7 may execute focus adjustment by using the focus detection signals provided from either the image sensor 1 or the image sensor 2, or it may execute focus adjustment by using the focus detection signals having originated from the two image sensors and having undergone correction processing such as averaging. In the latter case, the focus detection accuracy is likely to improve, since the focus adjustment is executed by using a greater number of focus detection signals.

In reference to FIGS. 2A through 2C and FIGS. 3A through 3C, the structures of the first and second image sensors 1 and 2, the primary components of the image-capturing device, are described in detail.

Figure 2A:
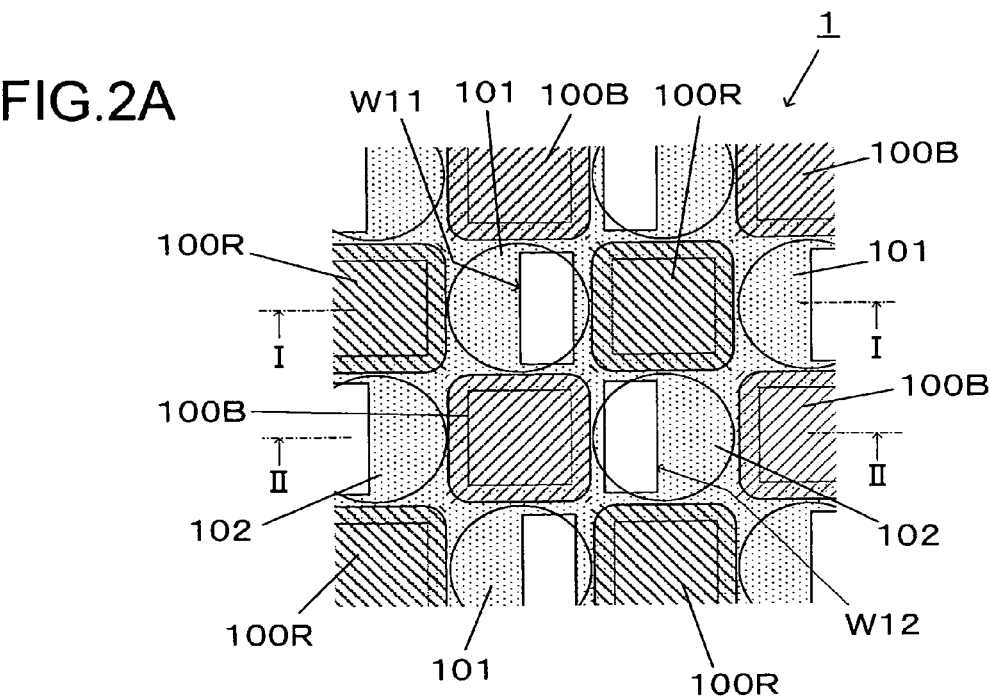
FIGS. 2A through 2C schematically illustrate the structure adopted in the first image sensor 1 in a first embodiment, with FIG. 2A being a partial plan view, FIG. 2B being a partial sectional view taken along line I-I in FIG. 2A and FIG. 2C being a partial sectional view taken along line II-II in FIG. 2A.

As the partial plan view presented in FIG. 2A shows, the first image sensor 1 includes red color image-capturing pixels 100R that generate red color signals, blue color image-capturing pixels 100B that generate blue color signals, first focus detection pixels 101 and second focus detection pixels 102, disposed in an orderly two-dimensional array. The first focus detection pixels 101 each include an opening taking up an area in the right half of the pixel in FIG. 2A, which functions as a light receiving portion W11. The second focus detection pixels 102 each include an opening taking up an area in the left half of the pixel in FIG. 2A, which functions as a light receiving portion W12. The red color image-capturing pixels 100R, the blue color image-capturing pixels 100B, and the first and second focus detection pixels 101 and 102 are formed so as to assume matching sizes.

Specifically, red color image-capturing pixels 100R and first focus detection pixels 101 are disposed so as to occupy alternate positions in a row extending along the lateral direction and likewise, a blue color image-capturing pixel 100B and a second focus detection pixel 102 are disposed so as to occupy alternate positions in a row. In addition, a lateral row made up with red color image-capturing pixels 100R and first focus detection pixels 101 and a lateral row made up with blue color image-capturing pixels 100B and second focus detection pixels 102 occupy alternate positions along the top/bottom direction in FIG. 2A. Furthermore, the red color image-capturing pixels 100R and the blue color image-capturing pixels 100B are disposed with an offset, the extent of which is equivalent to one pixel, along the direction in which the rows extend, i.e., along the lateral direction. In other words, the four types of pixels, i.e., the red color image-capturing pixels 100R, the blue color image-capturing pixels 100B, the first focus detection pixels 101 and the second focus detection pixels 102 are evenly distributed by ensuring that the following requirements (1) and (2) are satisfied.

(1) A red color image-capturing pixel 100R and a blue color image-capturing pixel 100B never occupy positions directly adjacent to each other.

(2) A first focus detection pixel 101 and a second focus detection pixel 102 never occupy positions directly adjacent to each other.

Assuming that the first image sensor 1 includes "n" red color image-capturing pixels 100R, the quantities of blue image-capturing pixels 100B, first focus detection pixels 101 and second focus detection pixels 102 will all be "n". In other words, the first image sensor 1 includes the four types of pixels all in equal quantities. It is to be noted that a column that includes the first focus detection pixels 101 is paired up with a column that includes second focus detection pixels and that the pair of focus detection pixel columns thus formed is engaged in focus detection through a split-pupil method, i.e., through a phase difference detection method.

Figure 2B:
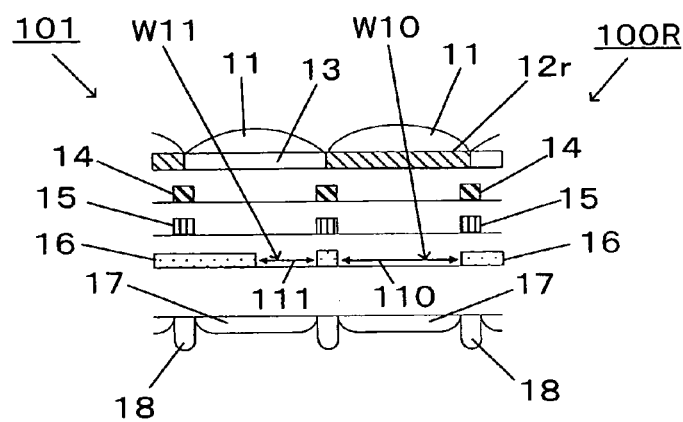
Figure 2C:
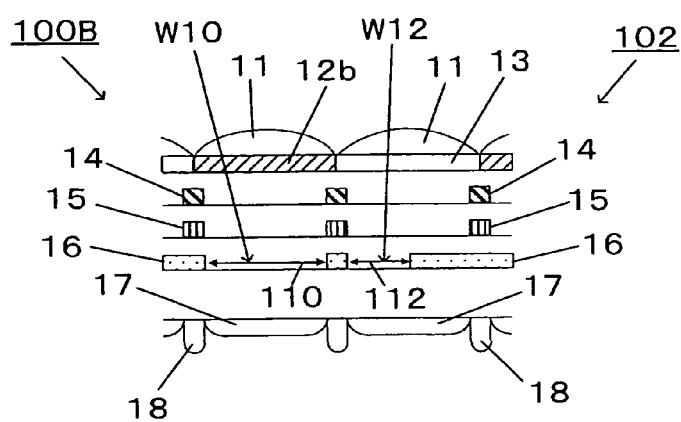

Subject light advances from top to bottom in both FIG. 2B, presenting a sectional view taken along line I-I in FIG. 2A, and FIG. 2C, presenting a partial sectional view taken along line II-II in FIG. 2A.

A red color image-capturing pixel 100R in FIG. 2B includes a micro-lens 11, a red color filter 12*r*, wiring layers 14 and 15, a light shielding layer 16 with an opening W10 formed therein and a photo diode (PD) 17, laminated one on top of another in the direction extending along the path through which the subject light advances. The photodiode 17 is electrically insulated via separating layers 18. Since the red color filter 12*r* exclusively transmits red color-component light in the subject light, the photodiode 17 outputs an imaging signal generated by executing photoelectric conversion on the red color light. It is to be noted that the size of the opening W10 at the red color image-capturing pixel 100R is set substantially equal to the full pixel size, so as to allow the maximum amount of light to be received.

A first focus detection pixel 101 includes a micro-lens 11, a colorless transparent filter 13, wiring layers 14 and 15, a light shielding layer 16 with an opening W11 formed therein and a photodiode 17, laminated one on top of another in the direction extending along the path through which the subject light advances. The photodiode 17 is electrically insulated via separating layers 18. Since the transparent filter 13 transmits all the incident light, i.e., the red color component light, the green color component light and the blue color component light at various wavelengths, the photodiode 17 outputs a focus detection signal generated by executing photoelectric conversion on the light constituted with all the color components having been received via the opening W11. It is to be noted that an arrowed line 110 indicates the width of the opening W10, whereas an arrowed line 111 indicates the width of the opening W11. The width or the area of the opening W11 at the first focus detection pixel 101 is set substantially half the width or the area of the opening W10 at the red color image-capturing pixel 100R.

A blue color image-capturing pixel 100B in FIG. 2C includes a micro-lens 11, a blue color filter 12b, wiring layers 14 and 15, a light shielding layer 16 with an opening W10 formed therein and a photo diode 17, laminated one on top of another in the direction extending along the path through which the subject light advances. The photodiode 17 is electrically insulated via separating layers 18. Since the blue color filter 12b exclusively transmits blue color-component light in the subject light, the photodiode 17 outputs an imaging signal generated by executing photoelectric conversion on the blue color light.

A second focus detection pixel 102 includes a micro-lens 11, a colorless transparent filter 13, wiring layers 14 and 15, a light shielding layer 16 with an opening W12 formed therein and a photodiode 17, laminated one on top of another in the direction extending along the path through which the subject light advances. The photodiode 17 is electrically insulated via separating layers 18. The transparent filter 13 at the second focus detection pixel 102 is identical to the transparent filter 13 at the first focus detection pixel 101. It is to be noted that the opening W10 at the blue color image-capturing pixel 100B assumes an areal size matching that of the opening W10 at the red color image-capturing pixel 100R. An arrowed line 112 indicates the width of the opening W12. The width or the area of the opening W12 is set substantially half the width or the area of the opening W10 at the blue color image-capturing pixel 100B.

The red color image-capturing pixels 100R in the first image sensor 1 structured as described above each receive red color component light in the subject light, having been transmitted through the red color filter 12r, at the photodiode 17 via the opening W10 in the light shielding layer 16 and outputs a red color component light imaging signal. The blue color image-capturing pixels 100B each receive blue color light in the subject light, having been transmitted through the blue color filter 12b, at the photodiode 17 via the opening W10 in the light shielding layer 16 and outputs a blue color component light imaging signal. It is to be noted that the curvature and the refractive index of the micro-lenses 11, the distance between the micro-lens 11 and the photodiode 17 at each image-capturing pixel, and the like are set so as to allow the maximum amount of light to be guided to the photodiodes 17 in the image-capturing pixels 100R and 100B.

At each first focus detection pixel 101, the subject light having been transmitted through the transparent filter 13 is received at the photodiode 17 via the opening W11 in the light shielding layer 16. The light flux received at the photodiode 17 will have passed through one of the two areas paired up with each other, which are defined in the exit pupil of the photographic lens 3, and the photodiode 17 outputs a focus detection signal corresponding to the intensity of the light received thereat. Likewise, at each second focus detection pixel 102, the subject light having been transmitted through the transparent filter 13 is received at the photodiode 17 via the opening W12 in the light shielding layer 16. The light flux received at the photodiode 17 will have passed through the other area in the pair of areas defined at the exit pupil of the photographic lens 3, and the photodiode 17 outputs a focus detection signal corresponding to the intensity of the light received thereat.

The focus adjustment unit 7 calculates a defocus quantity indicating the extent of defocusing based upon a focus detection signal string originating from a first focus detection pixel column and a focus detection signal string originating from a second focus detection pixel column.

As shown in FIGS. 2A through 2C, the focusing condition can be detected along the horizontal direction in the photographic field by detecting an image shift quantity based upon output signals from the focus detection pixels 101 with the openings W11 thereof each taking up the right half of the pixel and output signals from the focus detection pixels 102 with the openings W12 thereof each taking up the left half of the pixel.

Figure 3A:
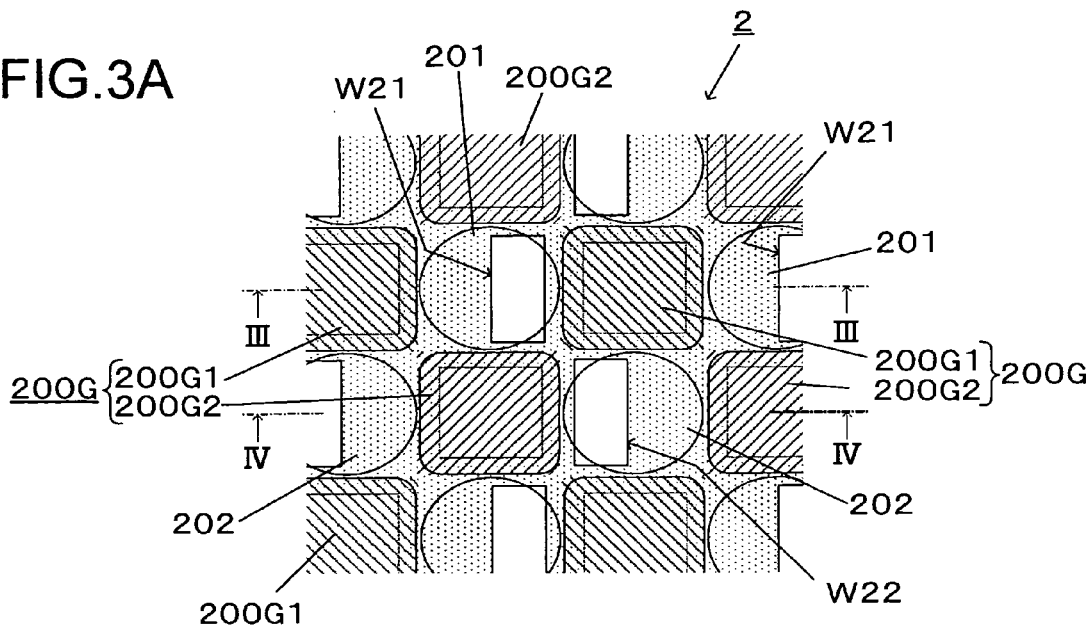
FIGS. 3A through 3C schematically illustrate the structure adopted in the second image sensor 2 in the first embodiment, with FIG. 3A being a partial plan view, FIG. 3B being a partial sectional view taken along line III-III in FIG. 3A and FIG. 3C being a partial sectional view taken along line IV-IV in FIG. 3A.
Figure 3B:
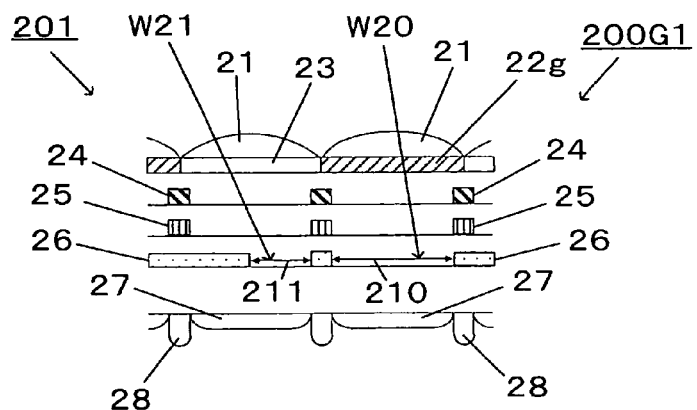
Figure 3C:
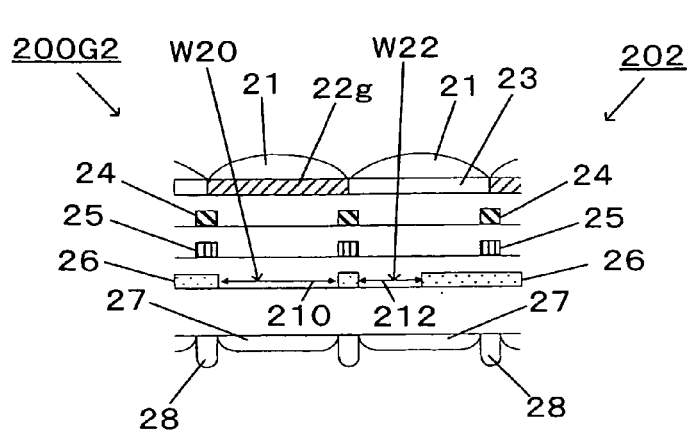

Next, in reference to FIGS. 3A through 3C, the structure adopted in the image sensor 2 is described in detail.

As the partial plan view presented in FIG. 3A shows, the second image sensor 2 includes green color image-capturing pixels 200G that generate green color signals, third focus detection pixels 201 and fourth focus detection pixels 202, disposed in an orderly two-dimensional array. The third focus detection pixels 201 each include an opening W21 taking up an area in the right half of the pixel in FIG. 3A. The fourth focus detection pixels 202 each include an opening W22 taking up an area in the left half of the pixel in FIG. 3A. The green color image-capturing pixels 200G the third focus detection pixels 201 and fourth focus detection pixels 202 at the second image sensor 2 are formed so as to assume a size matching that of the pixels 100R, 101 and 102 at the first image sensor 1.

In the following description, image-capturing pixels 200G disposed in a row, extending along the left/right direction, i.e., the lateral direction in FIG. 3A, together with third focus detection pixels 201 so that an image-capturing pixel 200G and a third focus detection pixel occupy alternate positions will be referred to as image-capturing pixels 200G1. Likewise, image-capturing pixels 200G and a fourth focus detection pixel disposed in a row together with fourth focus detection pixels 202 so that an image-capturing pixel 200G occupy alternate positions will be referred to as image-capturing pixels 200G2. However, the image-capturing pixels 200G1 and the image-capturing pixels 200G2 are, in fact, substantially identical.

The green image-capturing pixels 200G and the third and fourth focus detection pixels 201 and 202 are disposed by ensuring that an image-capturing pixel 200G never occupies a position directly adjacent to another image-capturing pixel 200G and that a third focus detection pixel 201 and a fourth focus detection pixel 202 never occupy positions directly adjacent to each other. In addition, assuming that there are "2n" green color image-capturing pixels 200G in the image sensor 2, the quantities of third focus detection pixels 201 and forth focus detection pixels 202 are both "n". The image sensor includes equal quantities of image-capturing pixels 200G1 and image-capturing pixels 200G2, i.e., it includes "n" image-capturing pixels 200G1 and "n" image-capturing pixels 200G2.

Subject light advances from top to bottom in both FIG. 3B, presenting a sectional view taken along line III-III in FIG. 3A, and FIG. 3C, presenting a partial sectional view taken along line IV-IV in FIG. 3A.

An image-capturing pixel 200G1 in FIG. 3B includes a micro-lens 21, a green color filter 22g, wiring layers 24 and 25, a light shielding layer 26 with an opening W20 formed therein and a photo diode 27, laminated one on top of another in the direction extending along the path through which the subject light advances. The photodiode 27 is electrically insulated via separating layers 28.

A third focus detection pixel 201 includes a micro-lens 21, a colorless transparent filter 23, wiring layers 24 and 25, a light shielding layer 26 with an opening W21 formed therein and a photodiode 27, laminated one on top of another in the direction extending along the path through which the subject light advances. The photodiode 27 is electrically insulated via separating layers 28.

An arrowed line 210 indicates the width of the opening W20 formed in the light shielding layer 26 at the image-capturing pixel 200G1, whereas an arrowed line 211 indicates the width of the opening W21 formed in the light shielding layer 26 at the third focus detection pixel 201. The width of the opening W21 is substantially half the width of the opening W20 formed in the light shielding layer 26 of the image-capturing pixel 200G1.

A green color image-capturing pixel 200G2 in FIG. 3C includes a micro-lens 21, a green color filter 22g, wiring layers 24 and 25, a light shielding layer 26 with an opening W20 formed therein and a photo diode 27, laminated one on top of another in the direction extending along the path through which the subject light advances. The photodiode 27 is electrically insulated via separating layers 28.

A fourth focus detection pixel 202 includes a micro-lens 21, a colorless transparent filter 23, wiring layers 24 and 25, a light shielding layer 26 with an opening W22 formed therein and a photodiode 27, laminated one on top of another in the direction extending along the path through which the subject light advances. The photodiode 27 is electrically insulated via separating layers 28.

An arrowed line 212 indicates the width of the opening W22 formed in the light shielding layer 26 at the fourth focus detection pixel 202. The width of the opening W22 is substantially half the width of the opening W20 formed in the light shielding layer 26 of the green color image-capturing pixel 200G2.

The green color image-capturing pixels 200G1 and 200G2 each receive green color component light in the subject light, having been transmitted through the corresponding green color filter 22g, at the photodiode 27 via the opening W20 in the light shielding layer 26 and output a green color component light imaging signal. The third and fourth focus detection pixels 201 and 202 each output a focus detection signal. The focus adjustment unit 7 calculates a defocus quantity indicating the extent of defocusing based upon these focus detection signals, as it does based upon focus detection signals output from the first and second focus detection pixels 101 and 102 in the first image sensor 1.

The positions of the first image sensor 1 and the second image sensor 2 relative to the half mirror 4 are set as described below. Namely, the first image sensor 1 and the second image sensor 2 are positioned relative to each other so that the green color image-capturing pixels 200G at the second image sensor 2 occupy positions corresponding to the positions of the first and second focus detection pixels 101 and 102 at the first image sensor 1.

Such a positional relationship between the first image sensor 1 and the second image sensor 2 sets the image-capturing pixels at the two image sensors, i.e., the green color image-capturing pixels 200G, the red color image-capturing pixels 100R and the blue color image-capturing pixels 100B, in a Bayer array pattern relative to the subject image. In other words, when the two image sensors 1 and 2 are positioned relative to each other as described above, outputs equivalent to imaging signals generated at an image sensor assuming a Bayer array can be obtained by combining the outputs from the image-capturing pixels at the two image sensors. As a result, imaging signals in a virtual Bayer array can be obtained from a total of four different types of pixels, i.e., the red color image-capturing pixels 100R and the blue color image-capturing pixels 100B at the image sensor 1 and the green color image-capturing pixels 200G1 and 200G2 at the image sensor 2.

(Operation)

An example of a photographing operation that may be executed in the digital camera structured as described above is now described.

Figure 4:
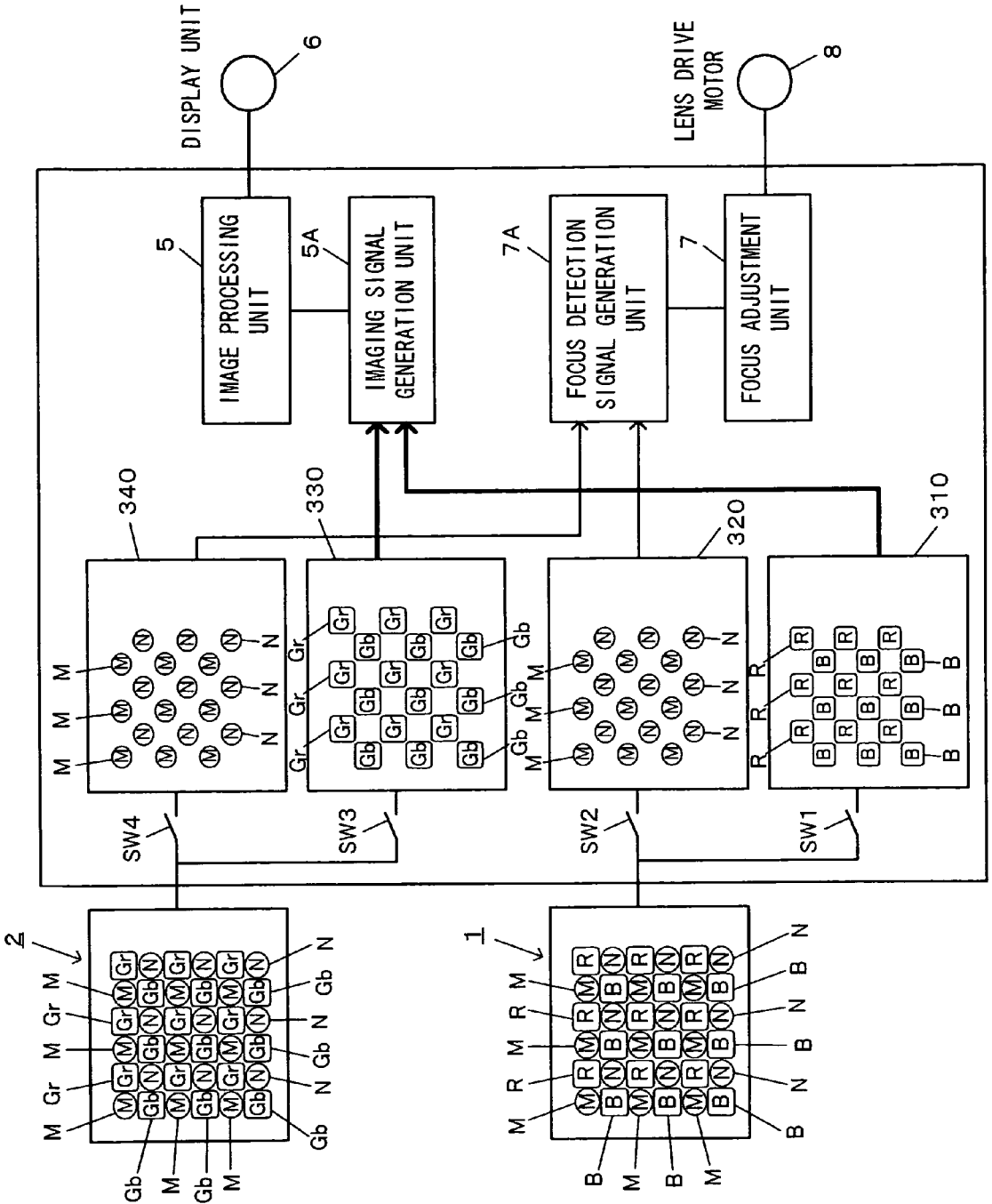
FIG. 4 schematically illustrates the process through which imaging signals and focus detection signals are generated based upon signals output from the image sensors 1 and 2 in the first embodiment.

As power to the camera is turned on, the first and second image sensors 1 and 2 in FIG. 4 are started up. At the first image sensor 1, the red color image-capturing pixels 100R and the blue color image-capturing pixels 100B each generate a red color imaging signal or a blue color imaging signal. In addition, the first and second focus detection pixels 101 and 102 at the first image sensor 1 each generate a focus detection signal. Likewise, the green color image-capturing pixels 200G each generate a green color imaging signal and the third and fourth focus detection pixels 201 and 202 each generate a focus detection signal at the second image sensor 2.

In FIG. 4, a red color imaging signal generated at a red color image-capturing pixel 100R, a blue color imaging signal generated at a blue color image-capturing pixel 100B, a focus detection signal generated at a first focus detection pixel 101 and a focus detection signal generated at a second focus detection pixel 102 in the first image sensor 1 are respectively notated as "R", "B", "M" and "N". Likewise, a green color imaging signal generated at a green color image-capturing pixel 200G1, a green color imaging signal generated at a green color image-capturing pixel 200G2, a focus detection signal generated at a third focus detection pixel 201 and a focus detection signal generated at a fourth focus detection pixel 202 in the second image sensor 2 are respectively notated as "Gr", "Gb", "M" and "N".

The imaging signals R and B and the focus detection signals M and N having been generated in the first image sensor 1 are separated via switches SW1 and SW2. The imaging signals R and B are then stored into a buffer memory 310, whereas the focus detection signals M and N are stored into a buffer memory 320. Likewise, the imaging signals Gr and Gb and the focus detection signals M and N having been generated in the second image sensor 2 are separated via switches SW3 and SW4. The imaging signals Gr and Gb are then stored into a buffer memory 330, whereas the focus detection signals M and N are stored into a buffer memory 340. The imaging signals R, B, Gr and Gb stored in the buffer memories 310 and 330 are individually read out and are then combined so as to constitute a Bayer array at an imaging signal generation unit 5A, which is part of the image processing unit 5.

Figure 5:
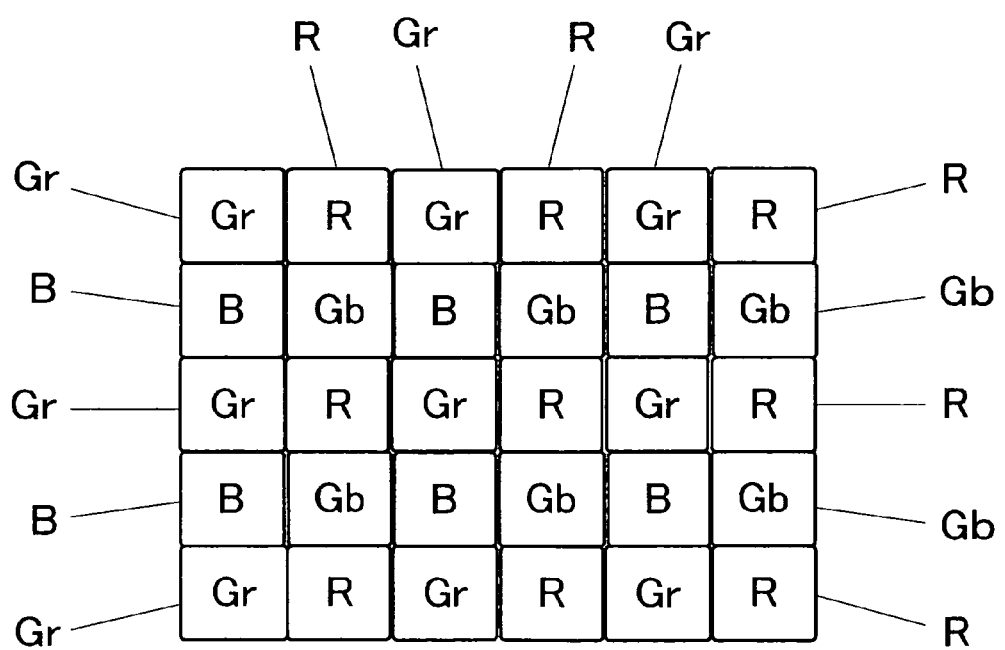
FIG. 5 is a schematic diagram in reference to which the imaging signal calculations executed in conjunction with the image sensors 1 and 2 will be described.

FIG. 5 shows imaging signals R, B, Gr and Gb having been combined so as to form a Bayer array pattern at the imaging signal generation unit 5A. The image processing unit 5 generates image data by executing a predetermined type of processing on the imaging signals R, B, Gr and Gb having been combined by the imaging signal generation unit 5A and brings up at the display unit 6 a reproduced image (through image) corresponding to the image data thus generated. In addition, in response to a photographing operation executed at the camera, the imaging signals R, B, Gr and Gb having undergone the image processing at the image processing unit 5 are recorded into a recording medium (not shown). It is to be noted that while the image processing unit 5 uses brightness signals indicating the brightness of the subject image when it executes the image processing on image data based upon the imaging signals R, B, Gr and Gb, focus detection signals may be utilized as brightness signals. The focus detection signals, each indicating a level corresponding to the intensity of the light flux having been transmitted through the corresponding colorless transparent filter, are ideal brightness signals.

The focus detection signals M and N having been stored in the buffer memories 320 and 340 are individually read out and are provided to a focus detection signal generation unit 7A constituting part of the focus adjustment unit 7. The focus adjustment unit 7 may assume a first focus adjustment mode, a second focus adjustment mode or a third focus adjustment mode. In the first mode, focus adjustment is executed based upon the focus detection signals originating from the first image sensor 1. In the second mode, focus adjustment is executed based upon the focus detection signals originating from the second image sensor 2. In the third mode, focus adjustment is executed based upon the focus detection signals originating from the first and second image sensors 1 and 2.

If the currently selected focus adjustment mode is the first mode, the focus detection signal generation unit 7A outputs the focus detection signals M and N stored in the buffer memory 320 to the focus adjustment unit 7. The focus adjustment unit 7 calculates a defocus quantity based upon the focus detection signals provided thereto and executes focus adjustment for the photographic lens by driving the lens drive motor 8 in FIG. 1 accordingly.

If the currently selected focus adjustment mode is the second mode, the focus detection signal generation unit 7A outputs the focus detection signals M and N stored in the buffer memory 340 to the focus adjustment unit 7. The focus adjustment unit 7 calculates a defocus quantity based upon the focus detection signals provided thereto and executes focus adjustment for the photographic lens accordingly.

If the currently selected focus adjustment mode is the third mode, the focus detection signal generation unit 7A incorporates the focus detection signals M and N stored in the buffer memory 320 and 340 and outputs the incorporated focus detection signals (synthetic focus detection signals) to the focus adjustment unit 7. The focus adjustment unit 7 calculates a defocus quantity based upon the synthetic focus detection signals and executes focus adjustment for the photographic lens. The focus detection signals may be incorporated at the focus adjustment unit 7 by, for instance, adding together focus detection signals in the buffer memory 320 and focus detection signals in the buffer memory 340, which positionally correspond to each other (i.e., by adding together focus detection signals pertaining to a common area of the subject image). More specifically, the focus adjustment unit 7 may add the focus detection signals M, M, . . . in the uppermost row in the buffer memory 320 in FIG. 4 to the focus detection signals M, M, . . . in the uppermost row in the buffer memory 340.

As an alternative, the focus adjustment unit 7 may execute focus adjustment in the third mode as described below. Namely, the focus adjustment unit 7 first calculates a defocus quantity based upon the focus detection signals M and N stored in the buffer memory 320 and calculates a defocus quantity based upon the focus detection signals M and N stored in the buffer memory 340. The focus detection unit 7 then averages the two defocus quantities having been calculated and executes focus adjustment for the photographic lens based upon the average defocus quantity.

The first image sensor 1 is manufactured by forming photodiodes 17 and separating layers 18 on a semiconductor circuit substrate, sequentially forming the light shielding layer 16, the wiring layer 15 and the wiring layer 14 over the photodiode 17 and the separating layers 18, forming red color filters 12r, blue color filters 12b and transparent filters 13 so as to form a specific pattern above the light shielding layer and the wiring layers, and forming micro lenses 11 at the upper-most position. When forming the micro-lenses 11, a transparent resin coating is first applied. The transparent resin coating then undergoes an etching process and a heat treatment process so as to form micro lenses 11 with a desired shape. The first image sensor 1 is manufactured as an integrated unit through a semiconductor image sensor manufacturing process (a type of silicon process). The second image sensor 2 can also be manufactured through a similar process.

The differences among the pixel structures assumed in the four different types of pixels in the first image sensor 1 described above may be summarized as below. A red color image-capturing pixel 100R and a blue color image-capturing pixel 100B differ from each other only in that the former includes a red color filter 12r, whereas the latter includes a blue color filter 12b. A first focus detection pixel 101 and a second focus detection pixel 102 differ from each other only in the position of the opening W11 and the position of the opening W12. The features differentiating the image-capturing pixels 100R and 100B from the first and second focus detection pixels 101 and 102 are that the image-capturing pixels include color filters 12r and 12b instead of the colorless transparent filters 13 and that the image-capturing pixels include openings W10 instead of the openings W11 and W12. Since the four different types of pixels are otherwise very similar to one another, the first image sensor 1, equipped with the four different types of pixels, can be manufactured through a relatively simple process. Likewise, the three different types of pixels in the second image sensor 2 have very similar structures and thus, the second image sensor 2 can also be manufactured through a relatively simple process.

The following advantages are achieved with the image-capturing device 10 and the digital camera in the first embodiment.

(1) Imaging signals that express the subject image at the positions of the first and second focus detection pixels 101 and 102 in the first image sensor 1 are provided via the image-capturing pixels 200G in the second image sensor 2, whereas imaging signals that express the subject image at the positions of the third and fourth focus detection pixels 201 and 202 in the second image sensor 2 are provided via the image-capturing pixels 100R and 100B in the first image sensor 1. Namely, by combining the outputs from the two image sensors 1 and 2, data equivalent to those output from a virtual image sensor with the entire imaging plane thereof assuming a Bayer array pattern are obtained, as explained earlier. This means that by using the outputs from the two image sensors 1 and 2 in combination, imaging signals equivalent to regular imaging signals can be obtained without having to execute interpolation operation processing or the like in order to generate imaging signals at the positions of the focus detection pixels. As a result, the extent to which the quality of captured images is compromised due to the presence of focus detection pixels at the image sensors can be minimized.

(2) The first image sensor 1 and the second image sensor 2, assuming similar laminated structures, can be manufactured through a common manufacturing process and their product qualities can be controlled through a common quality control system, which ultimately makes it possible to greatly reduce the manufacturing cost.

(3) Since the performance characteristics of the two image sensors 1 and 2 are similar, the output balance can be adjusted with ease and an outstanding advantage is assured in keeping down the assembly costs, as well.

(4) At the second image sensor 2, which only includes the image-capturing pixels 200G and the focus detection pixels 201 and 202, the output difference between the image-capturing pixels 200G1 and the image-capturing pixels 200G2 is extremely small. As a result, the output discrepancy adjustment between the image-capturing pixels 200G1 and the image-capturing pixels 200G2 can be skipped.

While it is desirable to provide the red color image-capturing pixels, the blue color image-capturing pixels, the first focus detection pixels, the second focus detection pixels, the third focus detection pixels and the fourth focus detection pixels in equal quantities and provide the green color image-capturing pixels in a quantity twice those of the other pixels as explained earlier, the pixel quantities do not need to sustain the relationships described above precisely, i.e., the quantities do not need to be exactly the same or the quantity of the green image-capturing pixels does not need to be exactly double the quantities of the other pixels, as long as they are substantially equal to one another and the quantity of the green color image-capturing pixels is substantially double the quantities of the other pixels.

Second Embodiment

In reference to drawings, the second embodiment is described. The following description focuses on features distinguishing the second embodiment from the first embodiment by assigning the same reference numerals to components identical to those in the first embodiment. Any features that are not specially noted may be assumed to be identical to those in the first embodiment. The pixel structures adopted in the first image sensor 1 and the second image sensor 2 in the embodiment are different from those in the first embodiment.

Figure 6A:
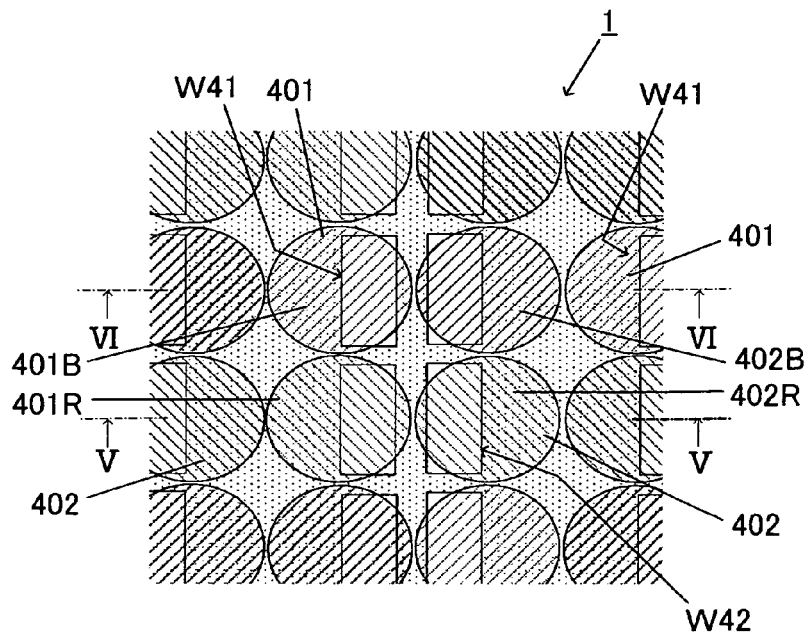
FIGS. 6A through 6C schematically illustrate the structure adopted in the first image sensor 1 in a second embodiment, with FIG. 6A being a partial plan view, FIG. 6B being a partial sectional view taken along line V-V in FIG. 2A and FIG. 6C being a partial sectional view taken along line VI-VI in FIG. 7A.
Figure 6B:
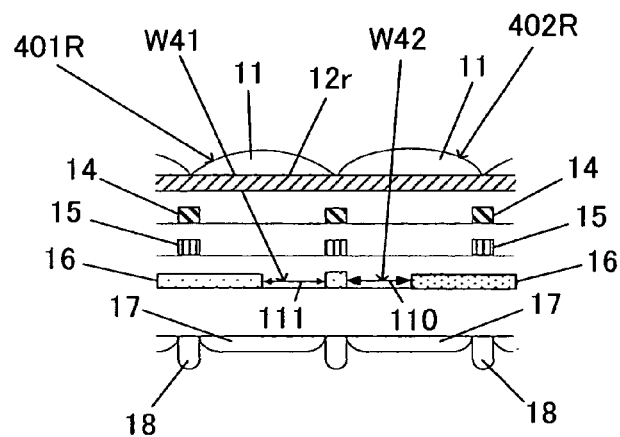
Figure 6C:
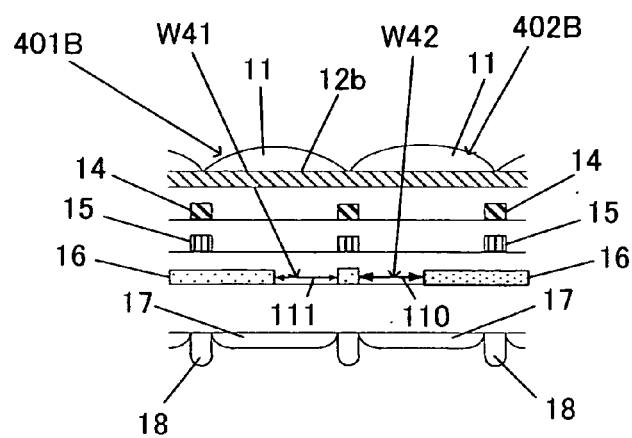

FIGS. 6A through 6C illustrate the structure of the first image sensor 1. The first image sensor 1 includes first image-capturing pixels 401 and second image-capturing pixels 402. As shown in the partial plan view presented in FIG. 6A, the first image-capturing pixels 401 each include an opening, i.e., a light receiving portion W41, taking up an area over the right half of the pixel in the figure, whereas the second image-capturing pixels 402 each include an opening, i.e., a light receiving portion W42, taking up an area over the left half of the pixel in the figure. The plurality of first image-capturing pixels 401 and the plurality of second image-capturing pixels 402 are disposed in a two-dimensional array. A first image-capturing pixel 401 and a second image-capturing pixel 402 are disposed so as to occupy alternate positions in a row extending along the lateral direction on the imaging plane of the first sensor 1. In addition, in each column extending along the top/bottom direction on the image-capturing plane of the first image sensor 1, either first image-capturing pixels 401 or second image-capturing pixels 402 are exclusively disposed.

In the first image sensor 1 achieved in the embodiment, first image-capturing pixels 401 and second image-capturing pixels 402, each of which outputs an imaging signal generated through photoelectric conversion of red color light, are disposed in a single row, and first image-capturing pixels 401 and second image-capturing pixels 402, each of which outputs an imaging signal generated through photoelectric conversion of blue color light, are disposed in another single row. The row of the first image-capturing pixels 401 and the second image-capturing pixels 402, each of which outputs a red color imaging signal, and the row of the first image-capturing pixels 401 and the second image-capturing pixels 402, each of which outputs a blue color imaging signal, are set alternately to each other. It is to be noted that the first image-capturing pixels 401 may each output a red color imaging signal and the second image-capturing pixels 402 may each output a blue color imaging signal. In other words, a column exclusively made up with pixels that output red color imaging signals and a column exclusively made up with pixels that output blue color imaging signals may be set alternately. It is to be noted that a first image-capturing pixel 401 that outputs a red color imaging signal will be referred to as a first image-capturing pixel 401R and a first image-capturing pixel 401 that outputs a blue color imaging signal will be referred to as a first image-capturing pixel 401B in the following description. Likewise, a second image-capturing pixel 402 that outputs a red color imaging signal, will be referred to as a second image-capturing pixel 402R and a second image-capturing pixel 402 that outputs a blue color imaging signal will be referred to as a second image-capturing pixel 402B in the following description.

FIG. 6B is a sectional view taken along line V-V in FIG. 6A and FIG. 6C is a sectional view taken along line VI-VI in FIG. 6A. As shown in FIG. 6B, a red filter $12r$ is disposed at the first image-capturing pixel 401R and the second image-capturing pixel 402R. Thus, red color light undergoes photoelectric conversion at photodiodes 17 at the first image-capturing pixel 401R and the second image-capturing pixel 402R and imaging signals containing red color information are output from the photodiodes 17. As shown in FIG. 6C, a blue filter $12b$ is disposed at the first image-capturing pixel 401B and/the second image-capturing pixel 402B. Thus, blue color light undergoes photoelectric conversion at photodiodes 17 at the first image-capturing pixel 401B and the second image-capturing pixel 402B and imaging signals containing blue color information are output from the photodiodes 17. It is to be noted that apart from the red filter $12r$ and the blue filter $12b$, the members constituting the first image-capturing pixels 401R and 401B are identical to the members constituting the first focus detection pixels 101 in the first embodiment. In addition, apart from the red filter $12r$ and the blue filter $12b$, the members constituting the second image-capturing pixels 402R and 402B are identical to the members constituting the second focus detection pixels 102 in the first embodiment.

As described in detail later, the imaging signal generation unit 5A generates red color imaging signals and blue color imaging signals based upon the imaging signals output from the first image-capturing pixels 401 and the imaging signals output from the second image-capturing pixels 402. The focus adjustment unit 7 calculates a defocus quantity based upon imaging signals output from first image-capturing pixels 401 and imaging signals output from second image-capturing pixels 402. An image shift quantity, detected by the focus detection unit 7 based upon the output signals from first image-capturing pixels 401 with openings W41 thereof taking up the right half of the pixel and second image-capturing pixels 402 with openings W42 thereof taking up the left half of the pixel, indicates the focusing condition manifesting along the lateral direction in the photographic field. As described above, the imaging signals output from the first image-capturing pixels 401 and the second image-capturing pixels 402 are used for purposes of image data generation and defocus quantity calculation. In other words, the first image-capturing pixels 401 and the second image-capturing pixels 402 function as both image-capturing pixels and focus detection pixels.

Figure 7A:
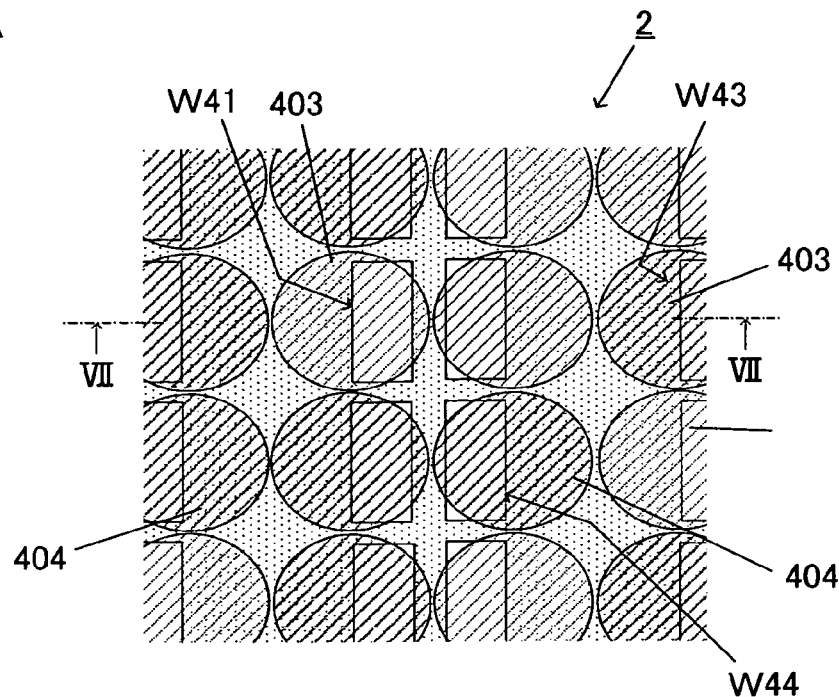
FIGS. 7A and 7B schematically illustrate the structure adopted in the second image sensor 2 in the second embodiment, with FIG. 7A being a partial plan view and FIG. 7B being a partial sectional view taken along line VII-VII in FIG. 7A.
Figure 7B:
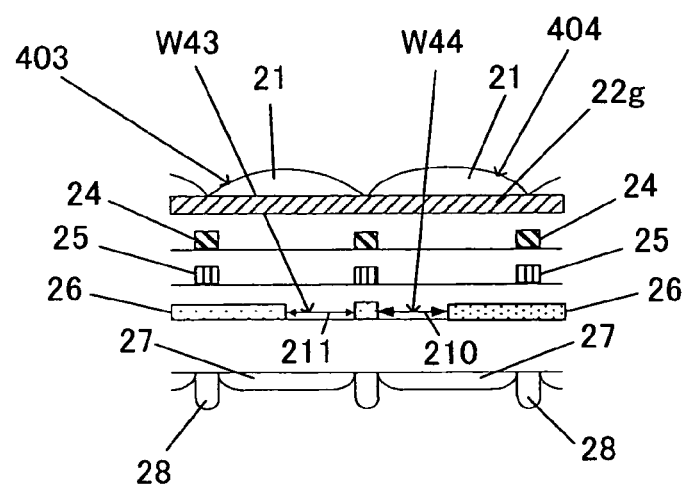

FIGS. 7A and 7B illustrate the structure of the second image sensor 2 achieved in the second embodiment. The second image sensor 2 includes third image-capturing pixels 403 and fourth image-capturing pixels 404. As shown in the partial plan view presented in FIG. 7A, the third image-capturing pixels 403 each include an opening, i.e., a light receiving portion W43, taking up an area over the right half of the pixel in the figure, whereas the fourth image-capturing pixels 404 each include an opening, i.e., a light receiving portion W44, taking up an area over the left half of the pixel in the figure. The plurality of third image-capturing pixels 403 and the plurality of fourth image-capturing pixels 404 are disposed in a two-dimensional array. A third image-capturing pixel 403 and a fourth image-capturing pixel 404 are disposed so as to occupy alternate positions in a row extending along the lateral direction on the imaging plane of the second sensor 2. In addition, in each column extending along the top/bottom direction on the image-capturing plane of the second image sensor 2, either third image-capturing pixels 403 or fourth image-capturing pixels 404 are exclusively disposed.

FIG. 7B is a sectional view taken along line VII-VII in FIG. 7A. As shown in FIG. 7B, a green filter 22g is disposed in conjunction with all the third image-capturing pixels 403 and fourth image-capturing pixels 404 constituting the second image sensor 2. Thus, green color light undergoes photoelectric conversion at photodiodes 27 at the third image-capturing pixels 403 and the fourth image-capturing pixels 404 and imaging signals containing green color information are output from the photodiodes 27. It is to be noted that apart from the green filter 22g, the members constituting the third image-capturing pixels 403 are identical to the members constituting the second focus detection pixels 102 in the first embodiment. In addition, apart from the green filter 22g, the members constituting the fourth image-capturing pixels 404 are identical to the members constituting the first focus detection pixels 101 in the first embodiment.

As described in detail later, the imaging signal generation unit 5A generates green color imaging signals based upon the imaging signals output from the third image-capturing pixels 403 and the imaging signals output from the fourth image-capturing pixels 404. The focus adjustment unit 7 calculates a defocus quantity based upon imaging signals output from third image-capturing pixels 403 and imaging signals output from fourth image-capturing pixels 404. An image shift quantity detected by the focus detection unit 7 based upon the output signals from third image-capturing pixels 403 with openings W43 thereof taking up the right half of the pixel and fourth image-capturing pixels 404 with openings W44 thereof taking up the left half of the pixel indicates the focusing condition manifesting along the lateral direction in the photographic field. As described above, the imaging signals output from the third image-capturing pixels 403 and the fourth image-capturing pixels 404 are used for purposes of image data generation and defocus quantity calculation. In other words, the third image-capturing pixels 403 and the fourth image-capturing pixels 404 include image-capturing pixels and focus detection pixels.

(Operation)

An example of a photographing operation that may be executed in the digital camera achieved in the second embodiment is now described.

Figure 8:
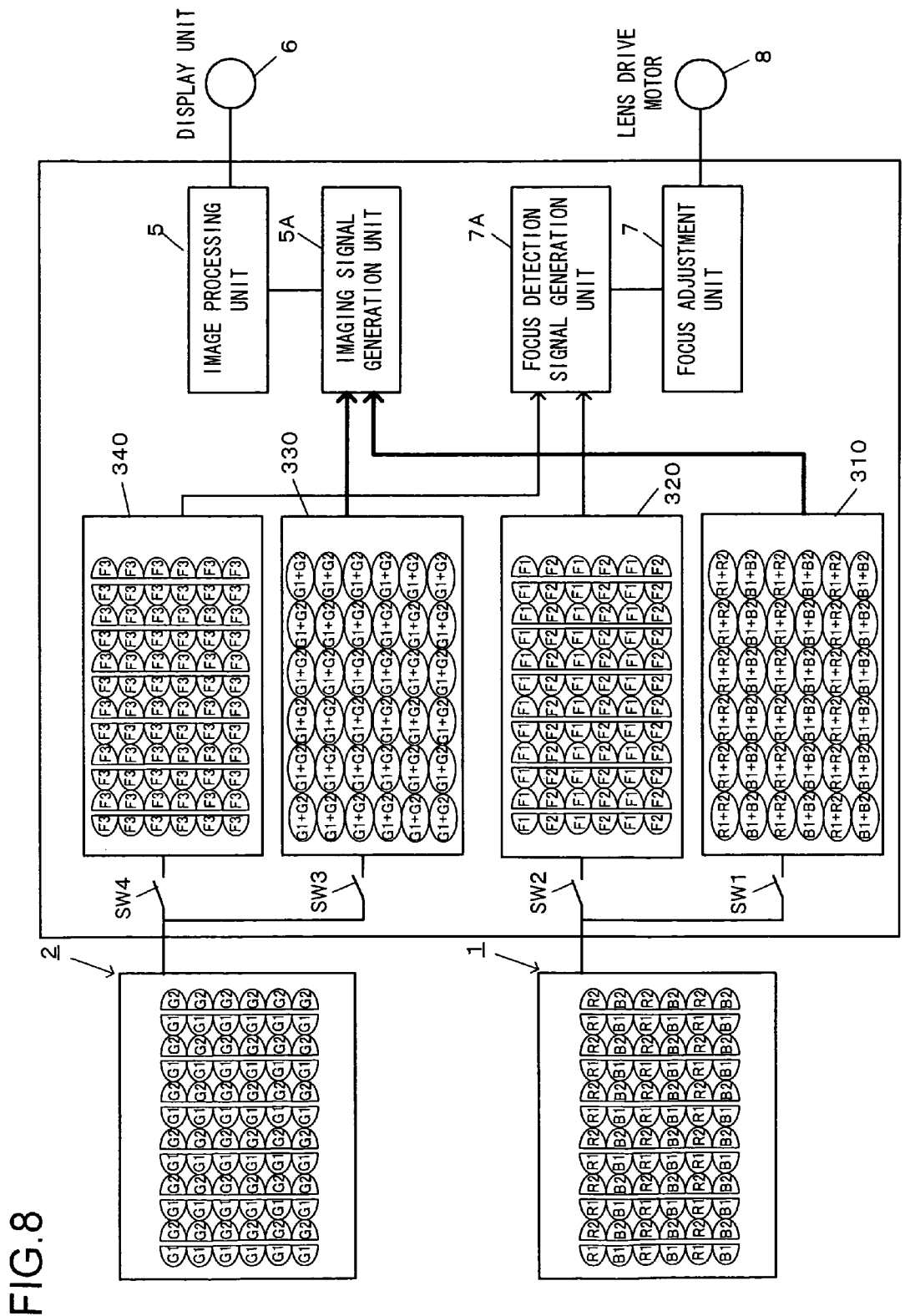
FIG. 8 schematically illustrates the process through which imaging signals and focus detection signals are generated based upon signals output from the image sensors 1 and 2 in the second embodiment.

As power to the camera is turned on, the first and second image sensors 1 and 2 in FIG. 8 are started up. Red color imaging signals and blue color imaging signals are generated at the first image sensor 1. In addition, green imaging signals are generated at the second image sensor 2.

The red color imaging signals and the blue color imaging signals having been generated at the first image sensor 1 are directed via a switch SW1 or SW2 and the two separate groups of imaging signals are stored into a buffer memory 310 or a buffer memory 320. The red color imaging signals and the blue color imaging signals stored into the buffer memory 310 at this time are used by the imaging signal generation unit 5A when generating image data constituted with red color imaging signals and blue color imaging signals. The red color imaging signals and the blue color imaging signals stored into the buffer memory 320, on the other hand, are used as focus detection signals by a focus detection signal generation unit 7A to be described in detail later.

The green color imaging signals having been generated at the image sensor 2 are directed via a switch SW3 or SW4 and the two separate groups of imaging signals are stored into a buffer memory 330 or a buffer memory 340. The green color imaging signals stored into the buffer memory 330 at this time are used by the imaging signal generation unit 5A when generating image data constituted with green color imaging signals. The green color imaging signals stored into the buffer memory 340, on the other hand, are used as focus detection signals by the focus detection signal generation unit 7A to be described in detail later.

In FIG. 8, a red color imaging signal generated at a first image-capturing pixel 401R is notated as R1, a blue color imaging signals generated at a first image-capturing pixel 401B is notated as B1, a red color imaging signal generated at a second image-capturing pixel 402R is notated as R2 and a blue color imaging signal generated at a second image-capturing pixel 402B is notated as B2. In addition, an imaging signal generated at a third image-capturing pixel 403 is notated as G1, whereas an imaging signal generated at a fourth image-capturing pixel 404 is notated as G2.

Imaging signals R1 and R2 having been generated at the first image sensor 1 are stored via the switch SW1 into the buffer memory 310 as image signals (R1+R2) each representing the sum of the imaging signals R1 and R2 having been generated at a first image-capturing pixel 401R and a second image-capturing pixel 402R included in a given row and occupying adjacent positions. Imaging signals B1 and B2 having been generated at the first image sensor 1 are stored via the switch SW1 into the buffer memory 310 as image signals (B1+B2) each representing the sum of the imaging signals B1 and B2 having been generated at a first image-capturing pixel 401B and a second image-capturing pixel 402B included in a given row and occupying adjacent positions.

Imaging signals R1 and R2 having been generated at the first image sensor 1 are stored into the buffer memory 320 via the switch SW2 as focus detection signals F1 (R1, R2), each resulting from a specific arithmetic operation executed by using the imaging signals R1 and R2 having been generated at a first image-capturing pixel 401R and a second image-capturing pixel 402R included in a given row and occupying adjacent positions. Imaging signals B1 and B2 having been generated at the first image sensor 1 are stored into the buffer memory 320 via the switch SW2 as focus detection signals F2 (B1, B2), each resulting from a specific arithmetic operation executed by using the imaging signals B1 and B2 having been generated at a first image-capturing pixel 401B and a second image-capturing pixel 402B included in a given row and occupying adjacent positions.

Imaging signals G1 and G2 having been generated at the second image sensor 2 are stored via the switch SW3 into the buffer memory 330 as imaging signals (G1+G2), each representing the sum of the imaging signals G1 and G2 having been generated at a third image-capturing pixel 403 and a fourth image-capturing pixel 404 included in a given row and occupying adjacent positions. Imaging signals G1 and G2 having been generated at the second image sensor 2 are stored into the buffer memory 340 via the switch SW4 as focus detection signals F3 (G1, G2) each resulting from a specific arithmetic operation executed by using the imaging signals G1 and G2 having been generated at a third image-capturing pixel 403 and a fourth image-capturing pixel 404 included in a given row and occupying adjacent positions.

The imaging signals (G1+G2), (R1+R2) and (B1+B2) stored in the buffer memories 310 and 330 are individually read out and combined at the imaging signal generation unit 5A so as to generate Bayer array data as in the first embodiment. The focus detection signals F1 (R1, R2), F2 (B1, B2) and F3 (G1, G2) stored in the buffer memories 320 and 340 are read out individually and are output to the focus detection signal generation unit 7A constituting part of the focus adjustment unit 7.

If the currently selected focus adjustment mode is the first mode, the focus detection signal generation unit 7A executes focus adjustment by using the focus detection signals F3 (G1, G2) stored in the buffer memory 340. If the currently selected focus adjustment mode is the second mode, the focus detection signal generation unit 7A executes focus adjustment by using the focus detection signals F1 (R1, R2) and F2 (B1, B2) stored in the buffer memory 320. If the currently selected focus adjustment mode is the third mode, the focus detection signal generation unit 7A executes focus adjustment by using the focus detection signals F3 (G1, G2) stored in the buffer memory 340 and the focus detection signals F1 (R1, R2) and F2 (B1, B2) stored in the buffer memory 320. It is to be noted that the focus detection signal generation unit 7A calculates the defocus quantity in each mode as has been described in reference to the first embodiment.

Advantages similar to those of the image-capturing device 10 and the digital camera 1 in the first embodiment are achieved with the image-capturing device 10 and the digital camera 1 in the second embodiment described above.

While it is desirable to provide equal quantities of the red color image-capturing pixels and the blue color image-capturing pixels, and provide the green color image-capturing pixels in a quantity twice those of the other pixels as explained earlier, the pixel quantities do not need to sustain the relationships described above precisely, i.e., the quantities do not need to be exactly the same or the quantity of the green image-capturing pixels does not need to be exactly double the quantities of the other pixels, as long as they are substantially equal to one another and the quantity of the green color image-capturing pixels is substantially double the quantities of the other pixels.

While a light flux is split into a pair of light fluxes via the half mirror 4 in the first and second embodiments, the light flux may be split via, for instance, a half prism instead of a half mirror.

The light flux traveling from the subject does not need to be split into a pair of light fluxes at the half mirror 4. Namely, the half mirror 4 may be manufactured so as to achieve different transmittances for a light flux to be guided to the first image sensor 1 and a light flux to be guided to the second image sensor 2. In such a case, a lower transmittance should be assumed in conjunction with the light flux to be guided to the second image sensor 2 constituted with pixels each equipped with a green filter so as to guide a greater amount of light to the first image sensor 1 constituted with pixels each equipped with a red filter or a blue filter.

It will be obvious that the image sensor 1 and the image sensor 2 in the first and second embodiments described above should be disposed within a digital camera with a positioning tolerance not exceeding the dimension of a single pixel. However, if a requirement related to the assembly cost results in an offset exceeding the dimension of a single pixel, the two image sensors may be positioned relative to each other with low accuracy and, in such a case, correction may be made through signal processing.

The above described embodiments are examples and various modifications can be made without departing from the scope of the invention.

What is claimed is:

1. An image-capturing device comprising:
    a first image sensor equipped with a plurality of first image-capturing pixels, a plurality of second image-capturing pixels and a plurality of first focus detection pixels, each of which receives one of light fluxes formed by splitting subject light having passed through an optical system, the first image-capturing pixels generating first color signals, the second image-capturing pixels generating second color signals and the first focus detection pixels outputting focus detection signals indicating a state of focus detection pertaining to the optical system; and
    a second image sensor equipped with a plurality of third image-capturing pixels and a plurality of second focus detection pixels, each of which receives another light flux formed by splitting the subject light, the third image-capturing pixels generating third color signals and the second focus detection pixels outputting focus detection signals indicating a state of focus detection pertaining to the optical system, wherein:
    when n represents a quantity of the first image-capturing pixels, quantities of the second image-capturing pixels, the third image-capturing pixels, the first focus detection pixels and the second focus detection pixels are n, 2n, 2n and 2n respectively.

2. An image-capturing device according to claim 1, wherein:
    positions of the first focus detection pixels relative to the first image-capturing pixels and the second image-capturing pixels at the first image sensor and positions of the second focus detection pixels relative to the third image-capturing pixels at the second image sensor are in correspondence to each other.

3. An image-capturing device according to claim 1, wherein:
    the first image-capturing pixels, the second image-capturing pixels and the first focus detection pixels are disposed in a uniform two-dimensional array so that any two adjacent pixels are of different types; and
    the third image-capturing pixels and the second focus detection pixels are disposed in a uniform two-dimensional array so that any two adjacent pixels are of different types.

4. An image-capturing device according to claim 1, wherein:
    the first color is red, the second color is blue and the third color is green.

5. An image-capturing device according to claim 1, further comprising:
    a focus detection unit that detects a state of focus detection pertaining to the optical system by using both focus detection signals output by the first focus detection pixels and focus detection signals output by the second focus detection pixels.

6. An image-capturing device according to claim 1, wherein:
    the first focus detection pixels include the first image-capturing pixels and the second image-capturing pixels; and
    the second focus detection pixels include the third image-capturing pixels.

7. An image-capturing device according to claim 6, wherein:
a row with the plurality of first image-capturing pixels disposed therein and a row with the plurality of second image-capturing pixels disposed therein are set so as to occupy alternate positions along a direction in which pixel columns extend at the first image sensor.

8. An image-capturing device according to claim 6, wherein:
a column with the plurality of first image-capturing pixels disposed therein and a column with the plurality of second image-capturing pixels disposed therein are set so as to occupy alternate positions along a direction in which pixel rows extend at the first image sensor.

9. An imaging apparatus, comprising:
a light flux splitting member that splits subject light having passed through a photographic optical system into two separate light fluxes;
a first image sensor equipped with a plurality of first image-capturing pixels, a plurality of second image-capturing pixels and a plurality of first focus detection pixels, each of which receives one of the two separate light fluxes, the first image-capturing pixels generating first color signals, the second image-capturing pixels generating second color signals, and the first focus detection pixels outputting focus detection signals indicating a state of focus detection pertaining to the optical system;
a second image sensor equipped with a plurality of third image-capturing pixels and a plurality of second focus detection pixels, each of which receives another light flux formed by splitting the subject light, the third image-capturing pixels generating third color signals, and the second focus detection pixels outputting focus detection signals indicating a state of focus detection pertaining to the optical system;
an image data generation unit that generates image data by using the first color signals generated at the first image-capturing pixels, the second color signals generated at the second image-capturing pixels and the third color signals generated at the third image-capturing pixels; and
a focus adjustment unit that adjusts a focusing condition of the photographic optical system based upon the focus detection signals output from the first focus detection pixels and the focus detection signals output from the second focus detection pixels, wherein:
when n represents a quantity of the first image-capturing pixels, quantities of the second image-capturing pixels, the third image-capturing pixels, the first focus detection pixels and the second focus detection pixels are n, 2n, 2n and 2n respectively.

10. An imaging apparatus according to claim 9, wherein:
positions of the first focus detection pixels relative to the first image-capturing pixels and the second image-capturing pixels at the first image sensor and positions of the second focus detection pixels relative to the third image-capturing pixels at the second image sensor are in correspondence to each other.

11. An imaging apparatus according to claim 9, wherein:
the first image-capturing pixels, the second image-capturing pixels and the first focus detection pixels are disposed in a uniform two-dimensional array so that any two adjacent pixels are of different types; and
the third image-capturing pixels and the second focus detection pixels are disposed in a uniform two-dimensional array so that any two adjacent pixels are of different types.

12. An imaging apparatus according to claim 9, wherein:
the first color is red, the second color is blue and the third color is green.

13. An imaging apparatus according to claim 9, wherein:
the first focus detection pixels include the first image-capturing pixels and the second image-capturing pixels; and
the second focus detection pixels include the third image-capturing pixels.

14. An imaging apparatus according to claim 13, wherein:
a row with the plurality of first image-capturing pixels disposed therein and a row with the plurality of second image-capturing pixels disposed therein are set so as to occupy alternate positions along a direction in which pixel columns extend at the first image sensor.

15. An imaging apparatus according to claim 13, wherein:
a column with the plurality of first image-capturing pixels disposed therein and a column with the plurality of second image-capturing pixels disposed therein are set so as to occupy alternate positions along a direction in which pixel rows extend at the first image sensor.

* * * * *